United States Patent
Dunkmann et al.

(10) Patent No.: US 9,707,686 B2
(45) Date of Patent: Jul. 18, 2017

(54) METHOD FOR OPERATING A VACUUM GENERATOR AND A VACUUM GENERATOR FOR CARRYING OUT SAID METHOD

(71) Applicant: J. Schmalz GmbH, Glatten (DE)

(72) Inventors: Walter Dunkmann, Baden-Baden (DE); Thomas Holecek, Freudenstadt (DE)

(73) Assignee: J. Schmalz GmbH, Glatten (DE)

( * ) Notice: Subject to any disclaimer, the term of this patent is extended or adjusted under 35 U.S.C. 154(b) by 279 days.

(21) Appl. No.: 14/378,500

(22) PCT Filed: Feb. 11, 2013

(86) PCT No.: PCT/EP2013/052677
§ 371 (c)(1),
(2) Date: Aug. 13, 2014

(87) PCT Pub. No.: WO2013/120802
PCT Pub. Date: Aug. 22, 2013

(65) Prior Publication Data
US 2015/0052990 A1    Feb. 26, 2015

(30) Foreign Application Priority Data
Feb. 13, 2012    (DE) .................. 10 2012 202 124

(51) Int. Cl.
*B25J 19/02* (2006.01)
*F04F 5/52* (2006.01)
(Continued)

(52) U.S. Cl.
CPC ........... *B25J 19/02* (2013.01); *B25J 15/0616* (2013.01); *B25J 19/06* (2013.01); *F04F 5/52* (2013.01)

(58) Field of Classification Search
CPC ........... B25J 15/0616; B25J 19/02; F04F 5/52
See application file for complete search history.

(56) References Cited

U.S. PATENT DOCUMENTS 4,762,467 A † 8/1988 Ackermann
5,617,338 A † 4/1997 Sugano et al.
(Continued)

FOREIGN PATENT DOCUMENTS

DE          42 29 834 A1 † 3/1993
DE    10 2004 031 924 A1    1/2006
(Continued)

OTHER PUBLICATIONS

Opposition Communication mailed by the European Patent Office on Apr. 20, 2017 in European Patent Application No. 13704086.1 and machine-generated translation obtained from the Google Translate website.
(Continued)

*Primary Examiner* — Erika J Villaluna
(74) *Attorney, Agent, or Firm* — Howard & Howard Attorneys PLLC

(57) ABSTRACT

The present invention is directed toward a method for operating a manipulator system having a vacuum manipulator device for manipulating a workpiece and a vacuum generator for generating a vacuum. The vacuum generator has a suction connection for suctioning in order to provide a vacuum supply for the vacuum manipulator device. Further, a diagnosis cycle is executed, including the steps of: provision of a vacuum for the vacuum manipulator device, and suctioning without a workpiece; and measurement of the equilibrium pressure obtained at the suction connection with a suction pressure sensor.

7 Claims, 3 Drawing Sheets

(51) Int. Cl.
*B25J 15/06* (2006.01)
*B25J 19/06* (2006.01)

(56) References Cited

U.S. PATENT DOCUMENTS

| | | | |
|---|---|---|---|
| 7,140,389 B2 † | 11/2006 | Schnatterer | |
| 7,263,890 B2 † | 9/2007 | Takahashi | |
| 8,678,776 B2 † | 3/2014 | Medow | |
| 9,175,688 B2 † | 11/2015 | Neel | |
| 2010/0303641 A1 | 12/2010 | Medow | F04F 5/52 |
| | | | 417/188 |
| 2015/0017025 A1 † | 1/2015 | Holecek et al. | |

FOREIGN PATENT DOCUMENTS

| | | |
|---|---|---|
| DE | 10 2007 058 114 A1 † | 6/2009 |
| DE | 10 2007 061 820 A1 † | 6/2009 |
| EP | 2 080 913 A1 † | 7/2009 |

OTHER PUBLICATIONS

Apr. 23, 2013 International Search Report for Application No. PCT/EP2013/052675.†
Nov. 5, 2013 International Preliminary Report on Patentability for Application No. PCT/EP2013/052675.†
Aug. 13, 2014 Written Opinion for Application No. PCT/EP2013/052675.†
Non-Final Office Action issued in corresponding U.S. Appl. No. 14/378,464 dated Feb. 9, 2017.†

† cited by third party

METHOD FOR OPERATING A VACUUM GENERATOR AND A VACUUM GENERATOR FOR CARRYING OUT SAID METHOD

CROSS-REFERENCE TO RELATED APPLICATIONS

This application is based upon and claims priority to PCT Application No. PCT/EP2013/052677 filed on Feb. 11, 2013, which claims priority to German Patent Application No. DE 102012202124.8 filed on Feb. 13, 2012.

BACKGROUND OF THE INVENTION

1. Field of the Invention

The present invention relates, generally, to a vacuum generator systems and, more specifically, to a method for operating a vacuum generator system and a vacuum generator for carrying out the method.

2. Description of Related Art

Vacuum generators of various types are known in the art and are used for operating vacuum manipulator devices, e.g. so-called "ejectors", which are operated with compressed air and draw in air with a suction connection. The generation of a vacuum occurs, for example, with a Venturi nozzle. Furthermore, electrically powered vacuum generators, e.g. vacuum pumps, are known in the art and generate a vacuum at a suction connection corresponding to an input variable (e.g. operational voltage and/or current).

As a result of the suction at the suction connection, a vacuum is provided to the vacuum manipulator device. Vacuum generators having an integrated monitoring device for the vacuum that has been generated are known from Published Patent Application Nos. DE 102007061820A1, DE102007058114A1, and EP 2080913A1. This enables a detection of the pressure at the suction connection, and makes it possible to indicate whether a pressure exceeds or falls below a threshold value via an electric signal. These signals can be used for implementing an Air Saving Control or an Energy Saving Control. For this, a valve in an ejector, for example, can be closed after a threshold value has been reached, and first re-opened when the pressure at the suction connection again exceeds the threshold value (in the following, a vacuum that has been attained at the suction connection will be referred to as a pressure that is lower than the ambient pressure).

A monitoring and energy optimization of this type is, however, prone to error. If, for example, the efficiency of the ejector changes, or the seal for the ejector develops a leak, or a leak occurs in the vacuum manipulator device connected thereto, then the given threshold value, in this case, would not be attained, or would be attained at a later point in time. The energy efficiency of the system would be impaired. Moreover, malfunctions could occur, e.g. if a workpiece could no longer be retained due to an insufficient vacuum at the suction connection. A method for the electrical processing of vacuum pressure data for a vacuum unit is described in Published U.S. Pat. No. 5,617,338. For this, pressure data is recorded by numerous sensors and compared with stored threshold values. However, there remains a need in the art for increasing the energy efficiency in vacuum manipulator systems of the specified type, and improving the reliability of the operation thereof.

SUMMARY OF THE INVENTION

The present invention overcomes the disadvantages in the prior art in a method for operating a manipulator system having a vacuum manipulator device for manipulating a workpiece and a vacuum generator for generating a vacuum. The vacuum generator has a suction connection for suctioning in order to provide a vacuum supply for the vacuum manipulator device. Further, a diagnosis cycle is executed, including the steps of: provision of a vacuum for the vacuum manipulator device, and suctioning without a workpiece; and measurement of the equilibrium pressure obtained at the suction connection with a suction pressure sensor.

The present invention is also directed toward a vacuum generator for executing the method described above. The vacuum generator includes a suction connection for suctioning, a suction pressure sensor for measuring the pressure at the suction connection, and a communications interface for transmitting measurement values from the suction pressure sensor.

The method is designed for operating a manipulator system, including a vacuum manipulator system, such as a vacuum gripping device or a vacuum chuck, for manipulating a workpiece, and a vacuum generator for generating a vacuum. The vacuum generator can be designed to generate a vacuum using pressurized air (e.g. an ejector). An electric vacuum generator is also conceivable (e.g. a vacuum pump that can be powered with electricity). The vacuum generator has a suction connection, through which air can be drawn in, thus being able to provide a vacuum in the vacuum manipulator device. If a vacuum is generated using pressurized air (e.g. an ejector), then the vacuum generator also has a pressure connection for supplying the vacuum generator with pressurized air. In order to discharge the pressurized air that has been used, and, if applicable, the air that has been drawn in, then, in this case, an exhaust air terminal is provided.

According to the method, a diagnosis cycle is executed, including the following steps, in particular in the depicted sequence: provision of the vacuum for the vacuum manipulator device (if necessary, a prior activation of the vacuum), and an un-engaged suction, meaning suction without placing the workpiece on the vacuum manipulator device for the manipulation thereof; and measurement of the equilibrium pressure established at the suction connection during the suction without a workpiece, using a suction pressure sensor.

From the results of the measurement of the equilibrium pressure during un-engaged suction, conclusions can be drawn regarding the efficiency and the flow quality of the system including the vacuum generator and the manipulator device (without a workpiece). By combining this with further data or further measurement values, as will be explained in greater detail below, it is possible to draw conclusions regarding the cause of a malfunction in the vacuum generator or in the manipulator device. Furthermore, the presence of a workpiece can be reliably detected. The evaluation of the obtained data enables an activation of the vacuum generator and/or the manipulator system such that an unnecessary waste of power (e.g. pressurized air or electricity) can be avoided.

The suctioning without a workpiece preferably occurs over the course of a diagnosis time period. The diagnosis time period can be predetermined for the diagnosis cycle, or can be a fixed time period, e.g. stored in a control device for the vacuum generator. The diagnosis time period is selected, in particular, such that it is long enough for an equilibrium pressure to be established that remains constant over time (in particular, such that it is longer than one second, e.g. numerous seconds). After measuring the equilibrium pressure, a manipulation of a workpiece can also occur during the diagnosis cycle, as will be explained in greater detail below.

In one embodiment, a signal representing the equilibrium pressure is issued via an interface during the diagnosis cycle. For this, the vacuum generator can have a communications interface. By way of example, the measurement signal can be issued by the suction pressure sensor. It is, however, conceivable that a "performance value" can be determined from the measured equilibrium pressure, using further determined measurement values and/or parameters of the system, and that this performance value can be issued via the communications interface. An energy efficient activation of the vacuum supplier and a monitoring of operational malfunctions can occur with the issued measurement values and/or performance values.

Advantageous designs of the method have shown that the equilibrium pressure and/or the performance value can be expressed in relation to at least one further process parameter. As a result, conclusions can be drawn regarding the efficiency of the manipulator system, and can be drawn in a targeted manner regarding problems with the individual components.

The method of the invention preferably also includes work cycles, which are executed sequentially, wherein a diagnosis cycle is executed between certain successive work cycles. A diagnosis cycle can, for example, be executed after a certain, predefined, or predefinable, number of work cycles. It is also conceivable, however, that the execution of a diagnosis cycle is triggered by a diagnosis start signal. This diagnosis start signal be supplied to the vacuum generator by an external control, for example. For this, the vacuum generator can, in turn, be provided with a communications interface.

A work cycle for a vacuum generator, or for a manipulator system, respectively, of the type described above, normally includes the successive work periods, which will be explained in greater detail below. In a first work period, if applicable, the activation of the vacuum supply, the provision of a vacuum, and the suctioning of a workpiece occurs, wherein the vacuum in the suction connection is obtained by decreasing the pressure from an ambient pressure to a holding value (H1). The holding value H1 is selected such that, for example, a reliable manipulation of the workpiece is enabled. If applicable, the vacuum can be regulated in a second work period, such that the measurable pressure in the suction connection lies between the holding value (H1) and a regulated holding value (H1+h1). By way of example, the vacuum can be regulated at least once between the holding value (H1) and the regulated holding value (H1+h1). At this point, the vacuum supply can be deactivated, when the pressure measured at the suction connection has sunk to the holding value (H1), or has sunk below this value. The vacuum supply is then re-activated when the pressure measured at the suction connection has again increased to the regulated holding value (H1+h1) after the vacuum supply has been deactivated. The work cycle includes, lastly, a further work period (third work period), in which the vacuum measured at the suction connection again increases to the ambient pressure, in order release the workpiece. In order to ensure that the workpiece is released from the manipulator device, the pressure at the suction connection can, in an advantageous design of the work cycle, increase to a blow-off pressure that is greater than the ambient pressure (fourth work period). This can occur over the course of a blow-off time period.\

During the first work period in the work cycle, preferably a measurement of the pressure in the suction connection occurs, with the suction pressure sensor. In order to determine whether a workpiece has been supplied, a control threshold value (H2) or a control pressure interval (defined by the control threshold value H2 and an offset value h2, lying above the control threshold value) can be defined. By comparing the pressure at the suction connection to the control threshold value (H2), it is possible to determine whether a workpiece has been supplied. If the pressure at the suction connection falls below the control threshold value (H2), or lies within the control pressure interval ([H2, H2+h2]), then it is possible to conclude that a workpiece is present at the manipulator device, and that a vacuum has accumulated at the suction connection.

It is also still possible to manipulate a workpiece during a diagnosis cycle, after measuring the equilibrium pressure. In doing so, the vacuum pressure decreases in a first period from the equilibrium pressure to the specified holding value (H1). The other work periods, as explained above, can then follow (i.e. if applicable, regulation in a second work period, for retaining the workpiece, increase of the vacuum pressure to the ambient pressure in a further work period, in order to release the workpiece, if applicable, accumulation of a blow-off pressure over the course of a blow-off time period, in order to ensure a release of the workpiece from the manipulator device).

A reliable diagnosis can also be obtained in that numerous diagnosis cycles are executed (triggered, for example, by a diagnosis signal) successively, without interruptions. If the equilibrium pressures determined in the various diagnosis cycles differ from one another, then this may be an indication of a malfunction or a leakage in the system.

If, during the operation of the manipulator system, in each case one, or a specific number of, diagnosis cycles are executed at predefined points in time, or at regular intervals, or following a given number of work cycles, wherein the values determined in the diagnosis cycles (equilibrium pressure or further measurement values, as explained below) are stored in a control device. From a control unit, systematic changes in, and/or the temporal development of, the determined values (in particular the equilibrium pressure) can be attributed to changes in the manipulator system. If, for example, the successively determined values for the equilibrium pressure indicate a tendency toward increasing, then this indicates an increasing leakage in the system, or a reduced efficiency. With a monitoring of the temporal course of the values determined in the diagnosis cycles (in particular for the equilibrium pressure), it is then possible to undertake a proactive maintenance of the system.

One embodiment of the method includes a first, and if applicable, after executing one or more work cycles, a further diagnosis cycle being executed, wherein the first, and in the further diagnosis cycles, a first and a further equilibrium pressure is determined. Following this, a comparison is made of the first and the further measured equilibrium pressures.

In another embodiment, a characterization cycle is executed in the method, prior to or after a diagnosis cycle or work cycle, for example. This is distinguished by the following steps (in particular in the following sequence): connecting the suction connection of the vacuum generator to a calibration suction hole in the vacuum generator; provision of a vacuum at the suction connection, and creating a suction at the calibration suction hole; measurement of the calibration pressure established at the suction connection, e.g. with the suction pressure sensor.

Advantageously, for the characterization cycle, the suction connection is subsequently connected to the calibration suction hole, and closed off, in particular, to the vacuum manipulator device. The suction through the calibration suction hole preferably occurs over a predefinable or predefined calibration period (tK). The calibration pressure is, in this regard, an equilibrium pressure that is established during suction through the calibration hole.

With the measurement in a calibration cycle it is possible, e.g. to determine a blockage or contamination within the vacuum generator (e.g. in the Venturi nozzle in an ejector) in a targeted manner. In considering this together with the equilibrium pressure measured during a diagnosis cycle, the efficiency of the manipulator system can thus be reliably monitored, and a potential source of a malfunction can be located.

The calibration suction hole can, e.g. be designed as a suction nozzle, having, e.g. a known flow resistance. The connection of the suction connection to the calibration suction hole preferably occurs with a controllable calibration valve, with which the suction connection, e.g., can selectively be connected, in terms of the flow, to the vacuum manipulator device, or to the calibration suction hole.

Similar to the explanation of the work cycles, characterization cycles are preferably executed at predefined points in time, or at regular intervals, or, in each case, after a predefined number of work cycles and/or diagnosis cycles. A signal representing the calibration pressure may be issued via the communications interface. The values for the calibration pressure determined in the characterization cycles are preferably stored in a control device for the manipulator system.

In the further design, a first pressure decrease time period is measured with a timing device during a work cycle (in particular prior to or after executing the diagnosis cycle and/or prior to or after executing a characterization cycle), over the course of which the vacuum pressure at the suction connection decreases, starting from the ambient pressure, to a control threshold value (H2). Additionally, or alternatively, a second pressure decrease time period can be measured with the timing device, over the course of which the vacuum pressure at the suction connection decreases from the control threshold value (H2) to a holding value (H1). The control threshold value (H2) is preferably selected such that a sinking of the pressure at the suction connection to the control threshold value (H2) can give an indication of when a workpiece has been supplied to the manipulator device, e.g. is attached to a suction gripper. The holding value H1 is selected, in particular, such that a reliable manipulation of the workpiece is possible.

A conclusion regarding the sealing capacity and the efficiency of the combined system, including the vacuum generator, the manipulator device and, if applicable, the workpiece, can be drawn from the measured pressure decrease time period, using, if applicable, the equilibrium pressure.

In operation, the pressure decrease time periods, in particular the second pressure decrease time period, can also be measured during a diagnosis cycle. With a correct operation of the system, the control threshold value (H2) frequently lies beneath the equilibrium pressure during an un-engaged suction.

Regarding the further design of the method, the pressure stability of the system while retaining a workpiece, in particular in the period between the holding value (H1) and the regulating holding value (H1+h1), is determined. For this, the vacuum supply can be deactivated during a diagnosis cycle and/or a work cycle, after the pressure measured at the suction connection has been lowered to the holding value (H1) or has sunk below this value. After deactivation of the vacuum supply, a pressure change rate, leakage rate and/or the temporal course of the pressure prevailing at the suction connection, can then be measured. Conclusions can be drawn from the measurement results regarding the sealing of the overall system including the vacuum generator, the manipulator device, and the workpiece. In conjunction with the determined equilibrium pressure, the sealing and efficiency, for example, of the manipulator device and/or the vacuum generator can thus be monitored.

In another embodiment, the determined equilibrium pressure is compared with a predefined, or predefinable, control threshold value (H2) lying between the ambient pressure and the holding value (H1). Advantageously, a warning signal is issued or triggered (from a control device for the vacuum generator, for example) if the equilibrium pressure lies below the control threshold value (H2).

As noted above, the control threshold value (H2) serves to determine whether a workpiece has been supplied to the manipulator device, and a vacuum can be created as a result of the presence of the workpiece. In the described case of a malfunction, a significant vacuum is already present at the suction connection when there is no workpiece present (meaning that the pressure measured at the suction connection has sunk below the control threshold value (H2)). A control to check for the presence of a workpiece by measuring the vacuum at the suction connection is then no longer possible.

It is also conceivable that the relationship between the equilibrium pressure and the control threshold value (H2) is determined. A performance value can be determined from this, and issued with a communications interface, for example. Preferably a percentage value is issued, wherein a zero percent performance corresponds to a situation in which the control threshold value (H2) is equal to the equilibrium point, and a hundred percent performance corresponds to a situation in which the equilibrium pressure is equal to the ambient pressure.

The control threshold value (H2) is selected such that, with a correct operation of the system including the vacuum generator and the manipulator device, the pressure prevailing at the suction connection only falls below the control threshold value if a workpiece has been supplied to the manipulator device. The control threshold value (H2) is furthermore selected such that, with a correct operation, the pressure measured at the suction connection lies above the control threshold value if no workpiece has been attached.

With the determination of the equilibrium pressure according to the invention, it can be prevented that, with a lower efficiency due to contamination or leakage in the vacuum generator, for example, it is erroneously concluded that a workpiece is present, if the equilibrium pressure that can be measured at the suction connection lies below the control threshold value due to the problems specified above. With the specified measures, it can thus be reliably checked whether or not a workpiece is present.

In one embodiment, the method includes the pressure at the suction connection increasing to a blow-off pressure lying above the ambient pressure during a work cycle and/or during a diagnosis cycle, after picking up (and manipulating) the workpiece. In particular, an increase in the pressure at the suction connection occurs over the course of a blow-off time period, until the blow-off pressure has been reached, and the pressure then returns to the ambient pressure. The blow-off pressure and/or the blow-off time period are preferably determined thereby in relation to the equilibrium pressure. Preferably the blow-off time period is selected in relation to the determined equilibrium pressure such that with a higher equilibrium pressure a longer blow-off time period is determined than with a lower equilibrium pressure.

If pressurized air is blown out of the suction connection, then a portion of the pressure to the flow resistance for the assembly including the vacuum generator and manipulator device escapes. This effect can be detected with the measurement of the equilibrium pressure in the diagnosis cycle. The blow-off pressure can then be selected such that it is great enough, and/or the blow-off time period can be selected that it is long enough that, despite the flow resistance of the system including the vacuum generator and manipulator device, it ensures a reliable blow-off of the workpiece. The necessary pressure can be increased thereby by a safety offset (e.g. 10 mbar).

With the specified measures, the blow-off procedure can be kept short and executed with a limited excess pressure. Nevertheless, a reliable release of the workpiece is ensured thereby. The blow-off impulse can be thus adjusted such that no unnecessary pressurized air energy is wasted, while nevertheless a reliable release is ensured.

The vacuum generator can be designed as explained, such that a vacuum can be generated using pressurized air (e.g. an ejector). Regarding the further design, the pressure in the pressure connection of this vacuum generator can be measured with a pressure supply sensor. This occurs, in particular, at the same time as the measurement of the equilibrium pressure at the suction connection. It is conceivable, however, that the pressure at the pressure connection is measured prior to, and/or during, and/or after the suction without a workpiece. The efficiency of the system can be determined with the pressure measurement at the pressure connection. Furthermore, a characteristic line can be recorded, which depicts, at least in sections, the relationship of the pressure at the suction connection to the pressure at the pressure connection.

Regarding the further design, the volume flow through the pressure connection can be measured. If, e.g. a vacuum pump, or another vacuum generator that can be powered by electricity, is used, then the input power, input voltage or supply voltage, and/or the input current or supply current, can be measured as additional data. Fundamentally, instead of, or in addition to measuring the pressure at the pressure connection, other input variables for the vacuum generator can be measured and used for determining the efficiency and sealing of the system. It is conceivable, for example, that the rotational rate of a pump or the supply voltage for an electric motor could be considered input variables.

As noted above, the present invention is also directed toward a vacuum generator, such as an ejector or electric vacuum generator. This has a suction connection for providing a suction, in order to create a vacuum supply for a vacuum manipulator device. The vacuum generator has, in particular, a suction pressure sensor for measuring the pressure at the pressure connection, and preferably has a communications interface for transmitting measurement values for the suction pressure sensor.

The vacuum generator can have, in particular, a controllable calibration valve, which is preferably disposed downstream of the suction connection in the course of the flow when suction is provided. The suction connection can be connected, in terms of flow and pressure, to an operating output for a vacuum manipulator device, or to a calibration suction hole in the vacuum generator using the calibration valve. Thus, by changing the valve setting, a diagnosis cycle, with un-engaged suction, a work cycle in which a workpiece has been applied, or a characterization cycle, in which suction is applied to the calibration suction hole, can be executed.

The vacuum generator can be designed as an ejector, and have a pressure connection for supplying the vacuum generator with pressurized air. Advantageously, a pressure supply sensor can be provided for measuring the pressure at the pressure connection. Moreover, an exhaust terminal can be provided, through which the consumed pressurized air and the air suctioned through the suction connection can be discharged. Additionally, or alternatively to the pressure sensor in the pressure connection, sensors for other input variables of the vacuum generator can be provided (e.g. rotational rate sensors for a pump, voltage meters for measuring the supply voltage for an electric motor, etc.).

Regarding the further design, the vacuum generator has a timing device, which acts in conjunction with the suction pressure sensor and/or the pressure supply sensor such that a first and/or second pressure decrease time period can be measured, as explained above. The vacuum generator preferably has a suction valve, with which the suction through the suction connection can be activated and deactivated. In this manner, the vacuum supply for the vacuum manipulator device can be activated and deactivated. Regarding the further design, the pressure connection is connected to the suction connection via a blow-off valve, such that a blow-off pressure (lying above the ambient pressure) can be generated in the suction connection over the course of a predefinable blow-off time period. Furthermore, preferably a control and/or regulating device is provided, which is designed such that the calibration valve can be controlled, in particular, can be switched between an operating setting (in which the suction connection is connected to the operation output for a vacuum manipulator device) and a calibration setting (in which the suction connection is connected to the calibration suction hole).

The control and/or regulating device is preferably also designed to activate the suction valve and/or the blow-off valve, depending on the equilibrium pressure determined in a diagnosis cycle and/or the values measured with the suction pressure sensor and/or the pressure supply sensor and/or, if applicable, with the timing device. In particular, the control device is designed such that the sensors, and if applicable, the valves, can be activated for executing the method of the invention.

The vacuum generator of the invention can be implemented as a compact structural unit ("compact ejector"). This makes it possible to integrate the vacuum generator in existing systems as well, and thus to increase the energy efficiency and the reliability of existing systems.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1A:
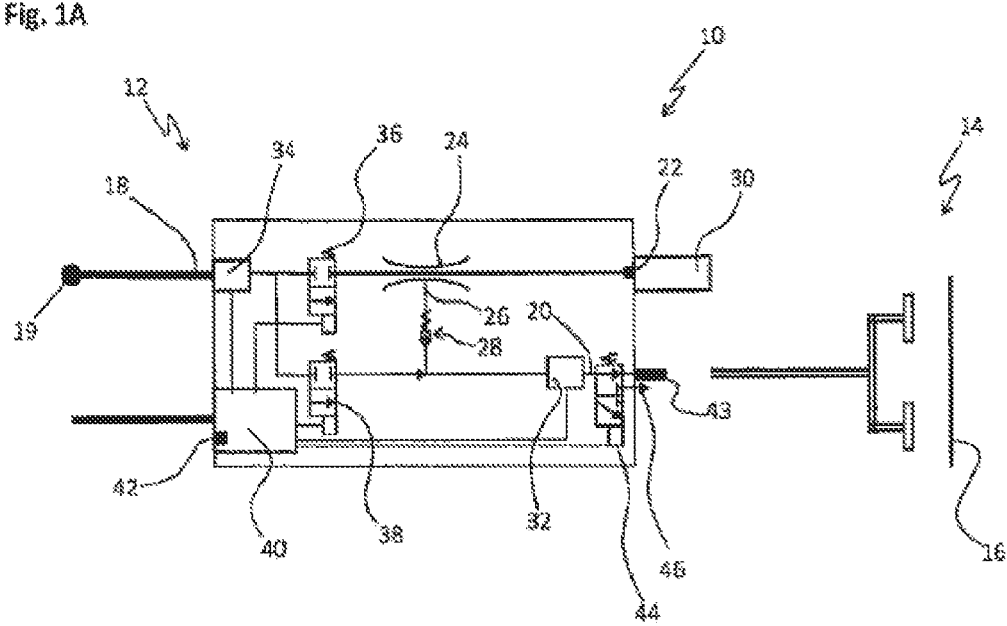
FIG. 1A shows a schematic depiction of a first embodiment of a vacuum generator and manipulator system according to the invention.

Referring now to the drawings, where the same reference numbers are used for identical or corresponding features, FIG. 1A shows a manipulator system 10, including a vacuum generator 12 designed as a compact ejector, and a vacuum manipulator device 14, designed in the example as a suction gripper.

The vacuum generator 12 has a pressure connection 18, which is connected in terms of flow to a pressurized air supply 19, such that the vacuum generator 12 can be supplied with pressurized air. Furthermore, a suction connection 20 is provided, through which air or another gaseous media can be drawn in, such that a vacuum supply can be provided to the vacuum manipulator device 14. Furthermore, an exhaust terminal 22 is provided.

The suction effect is generated with pressurized air in the known manner, in that pressurized air flows, starting from the pressure connection 18, through a Venturi nozzle 24, to the exhaust terminal 22. A suction connection 26 for the Venturi nozzle 24 is connected in terms of flow to the suction connection 20 via a back-pressure valve 28. The pressurized air flowing through the Venturi nozzle, on one hand, and the air suctioned through the suction connection 20, on the other hand, can be discharged through the exhaust terminal 22. The exhaust terminal 22 can have an exhaust silencer 30, such that flow noise is reduced when the system is operating.

A suction pressure sensor 32 is provided for measuring the pressure at the suction connection 20. The pressure at the pressure connection 18 can be measured with a pressure supply sensor 34.

The vacuum generator 12 also has a suction valve 36, with which a suctioning through the suction connection 20 can be activated and deactivated. In the depicted example, the suction valve is designed as a 2-way valve, which is disposed in the flow path between the pressure connection 18 and the Venturi nozzle 24. In its open setting, pressurized air flows through the Venturi nozzle 24, and results in a suction effect at the suction connection 20. In the closed setting of the suction valve 36, the Venturi nozzle 24 is disconnected from pressure connection 18, and the vacuum supply is deactivated.

The vacuum generator 12 also has a blow-off valve 38. This is configured such that a connection can be established and disconnected between the pressure connection 18 and the suction connection 20 via the blow-off valve 38. This makes it possible to provide a controlled pressure to the suction connection 20 from the pressure connection 18, and thus, to implement a blow-off impulse. In the example, the blow-off valve 38 is likewise designed as a 2-way valve.

Other designs and other configurations in the flow path are also possible for the suction valve 36 and the blow-off valve 38. As such, the suction valve 36 can also be disposed between the suction connection for the Venturi nozzle 24 and the suction connection 20, for example.

The vacuum generator 12 also includes a control device 40, to which the measurement signals from the suction pressure sensor 32 and the pressure supply sensor 34 can be supplied. Moreover, the control device 40 activates the valves 36 and 38. The control device 40 can also have a timing device (not shown in detail, but generally known in the art), with which the time elapsed between predefinable measurement values for the sensors 32 and 34 can be measured. The control device 40 is designed for activating the valves 36 and 38, as well as the sensors 34 and 32, for implementing the operating method according to the invention.

Further input variables for the vacuum generator 12 can be supplied to the control device 40, e.g. a supply voltage for an electric motor, or a rotational rate for a pump. Moreover, the control device provides a communications interface 42, with which measurement values, for example, can be transmitted to an external central processing unit.

The vacuum generator 12 also has a controllable calibration valve 44. This is designed as a directional valve in the depicted example, which can assume, selectively, an operating setting and a calibration setting. In the operating setting, the suction connection 20 is connected to the operation output 43 for the vacuum manipulator device 14, and in the calibration setting, it is connected to a calibration suction hole 46 in the vacuum generator 12, designed, in particular, as a suction nozzle (having a known flow resistance or flow characteristic). The calibration valve 44 is preferably pre-loaded for assuming the operating setting, i.e. it assumes the operating setting without being actively activated.

The control device 40 is designed, in particular, for activating the calibration valve 44. If the calibration valve 44 is switched to its calibration setting, then a calibration pressure (pK) can be measured with the suction pressure sensor as the equilibrium pressure that is to be set when suctioning occurs through the suction connection 20 and the calibration suction hole 46.

Figure 1B:
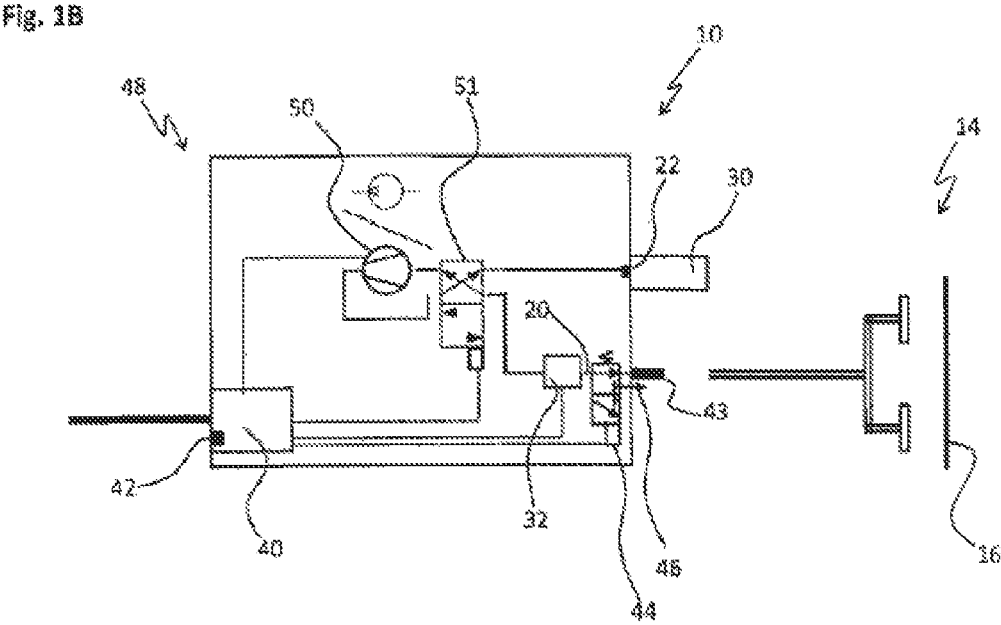
FIG. 1B shows a schematic depiction of another embodiment of a vacuum generator and manipulator system according to the invention.

FIG. 1B shows a vacuum generator 48 having an electric vacuum generator 50. This vacuum generator has a suction and an exhaust terminal, which are connected to a control valve 51 (designed as a 4/2-directional valve in the depicted example). The control valve 51 can assume a suction setting and a blow-out setting, wherein a suctioning through the suction connection 20 can occur in the suction setting, and an exhaust pressure in the suction connection can be obtained in the blow-out setting. In this respect, the control valve 51 unites the functions of the suction valve 36 and the exhaust valve 38 in the manner depicted in FIG. 1A.

The control device 40 for the vacuum generator is also designed, in particular, for activating the control valve 51, and preferably for activating the electric vacuum generator 50. Regarding the further features and functions of the vacuum generator 40, reference is made to the description for FIG. 1A.

Figure 2:
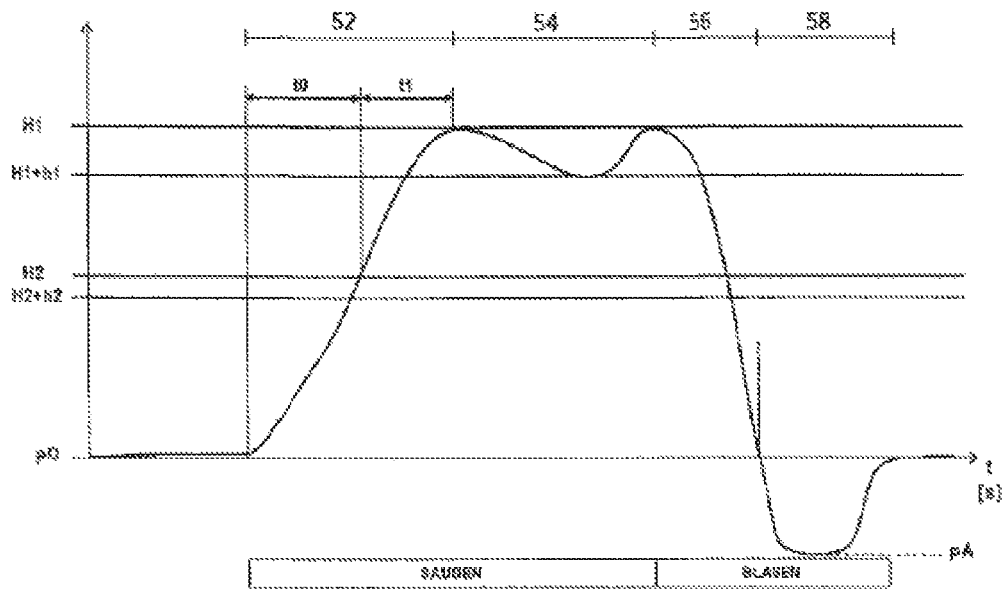
FIG. 2 shows a schematic depiction for explaining a work cycle.

A work cycle is described based on FIG. 2, such as can be executed with the manipulator system 10. In the depicted diagram, a vacuum prevailing at the suction connection 20, having a pressure that is lower than the ambient pressure p0, is plotted on the Y-axis. Positive Y-values thus correspond to a pressure that is lower than the ambient pressure p0. The X-coordinates represent the elapsed time. A work cycle is distinguished in the depicted example in that the pressure, starting from the ambient pressure, exhibits a temporal variation, and then returns to the ambient pressure.

The work cycle is divided into four work periods 52, 54, 56, 58 in the depicted example. In the first work period 52, an activation of the vacuum supply occurs (e.g. an opening of the suction valve 36, while the blow-off valve 38 remains closed). As a result, a suction effect is obtained at the suction connection 20, and a vacuum supply is provided to the vacuum manipulator device 14 connected thereto. The workpiece 16 can thus be suctioned thereon.

Because of the suction effect, the pressure measured by the suction pressure sensor 32 decreases, i.e. the vacuum increases in the depiction in FIG. 2. If the workpiece 16 is applied to the vacuum manipulator device 14, then the pressure at the suction connection can fall below a control threshold value H2. In this respect, a decrease in the pressure at the suction connection, to below the control threshold value H2, indicates that a component has been seized.

The time period, during which the pressure measured at the suction connection 20 falls below the control threshold value H2, starting from the ambient pressure p0, is indicated in FIG. 2 by t0. This first pressure decrease time period t0 can preferably be measured with a timing device (e.g. integrated in the control device 40). After exceeding the control threshold value H2, the pressure at the suction connection continues to decrease when a workpiece 16 has been applied, until a holding value H1 is obtained. This holding value is preferably selected such that a reliable manipulation of the workpiece 16 by the vacuum manipulator device 14 is possible.

The time period during which the pressure decreases to the holding value H1, starting at the control threshold value H2 (i.e. during which the vacuum increases), can in turn be measured, such as with a timing device (e.g. in the control device 40). This second pressure decrease time period is indicated by t1 in FIG. 2.

The control threshold value H2 can be selected to be, e.g. 500 mbar lower than the ambient pressure p0. The holding value H1 can be selected to be 700 mbar lower than the ambient pressure p0. The ambient pressure p0 lies, e.g. in the range of the standard pressure of 1,013 mbar.

A second work period 54 follows the first work period 52. The vacuum supply is regulated here, while gripping the workpiece 16, such that the pressure at the suction connection 20 lies between the holding value H1 and a regulating holding value H1+h1. For this, the vacuum supply can be deactivated, as explained above, after reaching the holding value H1, for example. If the pressure at the suction connection 20 then increases to above a holding value H1+h1, due to leakage, then the vacuum supply can be reactivated, in order to ensure a reliable manipulation of the workpiece 16.

In a third work period 56, the pressure measured at the suction connection 20 returns to the ambient pressure p0, in order to release the workpiece 16. This can occur due to leakage after deactivation of the vacuum supply, or it can occur with an intentional increase in pressure at the suction connection 20. By way of example, in order to release the workpiece 16, the suction valve 36 can be closed, and the exhaust valve 38 can be opened in a controlled manner.

Advantageously, a targeted blow-off of the workpiece occurs over the course of a fourth work period 58. At this point, the pressure at the suction connection 20 is increased in a targeted manner to a blow-off pressure pA lying above the ambient pressure p0. This occurs, for example, with the suction valve 36 closed, with a targeted opening of the exhaust valve 38.

Figure 3:
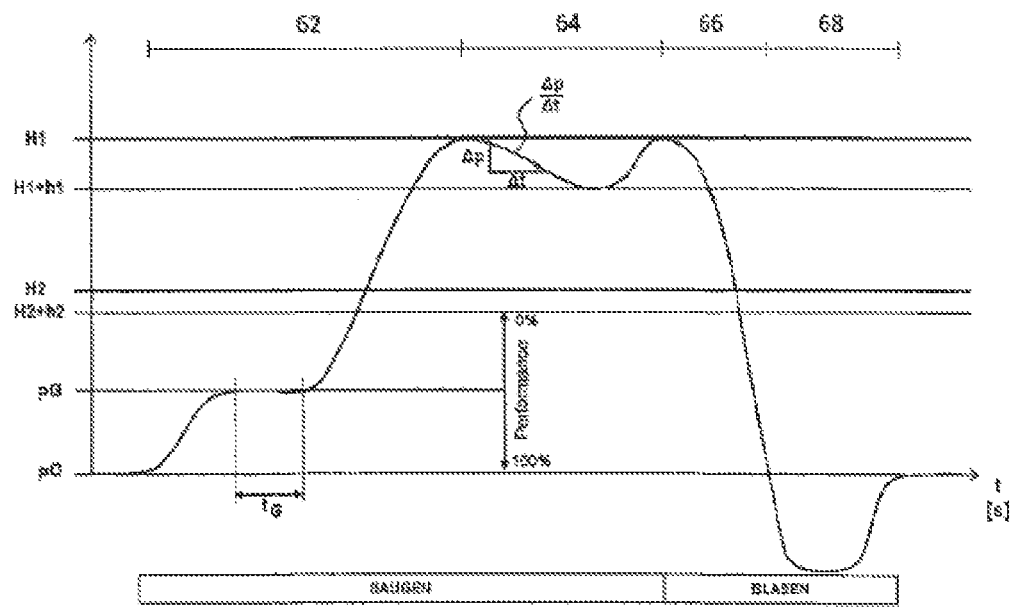
FIG. 3 shows a schematic depiction for explaining a diagnosis cycle.

A diagnosis cycle is shown in FIG. 3. This is subdivided into a first, second, third and fourth diagnosis period 62, 64, 66, 68, by way of example, wherein, instead of the diagnosis periods 64-68, pressure courses, such as those in the work periods 54-58, can follow the first diagnosis period 62.

An activation of the vacuum supply for the manipulator device occurs in the first diagnosis period 62, wherein these are offset to a state of the un-engaged suctioning, meaning that a suctioning with the vacuum manipulator device 14 occurs without a workpiece 16. Due to the properties concerning flow technology in the flow connections for the vacuum generator 12, the Venturi nozzle 24, and the vacuum manipulator device 14, an equilibrium pressure pG is obtained at the suction connection 20. For this measurement, the exhaust valve 38 is preferably closed, and the suction valve 36 is fully open.

The un-engaged suctioning preferably occurs over the course of a diagnosis time period tG, which is selected such that it is long enough that the equilibrium pressure can be reliably set (preferably longer than one second). The equilibrium pressure pG at the suction connection 20 can be measured with the suction pressure sensor 62. The measured equilibrium pressure pG can, for example, be stored in the control device 40. This can, e.g. transmit the equilibrium pressure pG to a central processing unit via the communications interface 42.

In the diagnosis cycle illustrated in FIG. 3, a manipulation of the workpiece occurs after the measurement of the equilibrium pressure pG. By bringing the workpiece into the proximity of the manipulator device 14, a vacuum can be formed at the suction connection 20, as explained above. As already explained, the pressure at the suction connection 20 first sinks, as a result, to below the control threshold value H2. As already explained, the measurement of a pressure at the suction connection 20 lying below the control threshold value H2 can be assessed as an indication that the workpiece 16 is held by the vacuum manipulator device 14.

When the workpiece 16 is held, the pressure falls to the holding value H1. As already explained, the pressure at the suction connection 20 can be regulated between the holding value H1 and the regulating holding value H1+h1 in a second diagnosis period 64, or, accordingly, in a second work period 54, in order to ensure a reliable manipulation of the workpiece.

If the vacuum supply is deactivated after the holding value H1 has been reached, then the temporal course of the pressure at the suction connection 20 and/or a pressure change rate $\Delta p/\Delta t$ is advantageously measured or determined with the method according to the invention. For this, the suction pressure sensor 32 can be designed for executing a corresponding measurement.

A third and fourth diagnosis period 66 and 68 can follow the second diagnosis period 64, in which a release of the workpiece occurs in the depicted example, and which correspond to the course in the work periods 56 and 58 in the depicted example.

Figure 4:
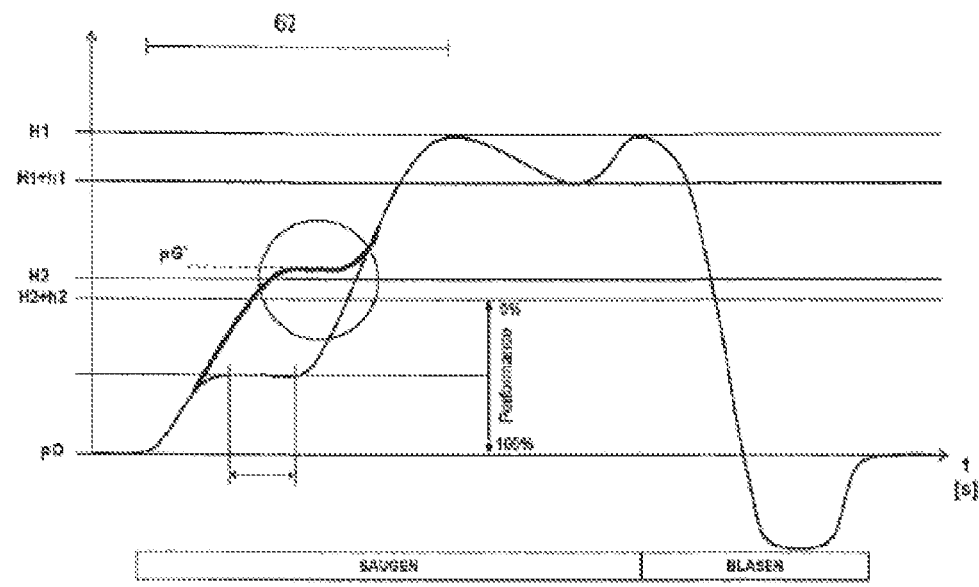
FIG. 4 shows a schematic depiction for explaining a malfunction.

The course of the pressure in the diagnosis cycle when the system 10 functions improperly is illustrated in FIG. 4. After activating the vacuum supply, the pressure also sinks at the suction connection 20 during un-engaged suctioning without a workpiece to an equilibrium pressure pG', which lies below the control threshold value H2. This can, for example, be because, due to a contamination, a sufficient volume flow cannot be drawn in through the vacuum manipulator device with a un-engaged suctioning. In this state it is no longer possible to conclude that a workpiece is present with a pressure measurement at the suction connection 20.

A reliable manipulation process is then no longer possible with the system 20. Advantageously, a warning signal is issued if an equilibrium pressure is determined to be below the control threshold value H2 in a diagnosis cycle (cf. FIG. 4). A comparison of the measured equilibrium pressure with the control threshold value H2, for example, can occur with the control device 40.

Figure 5:
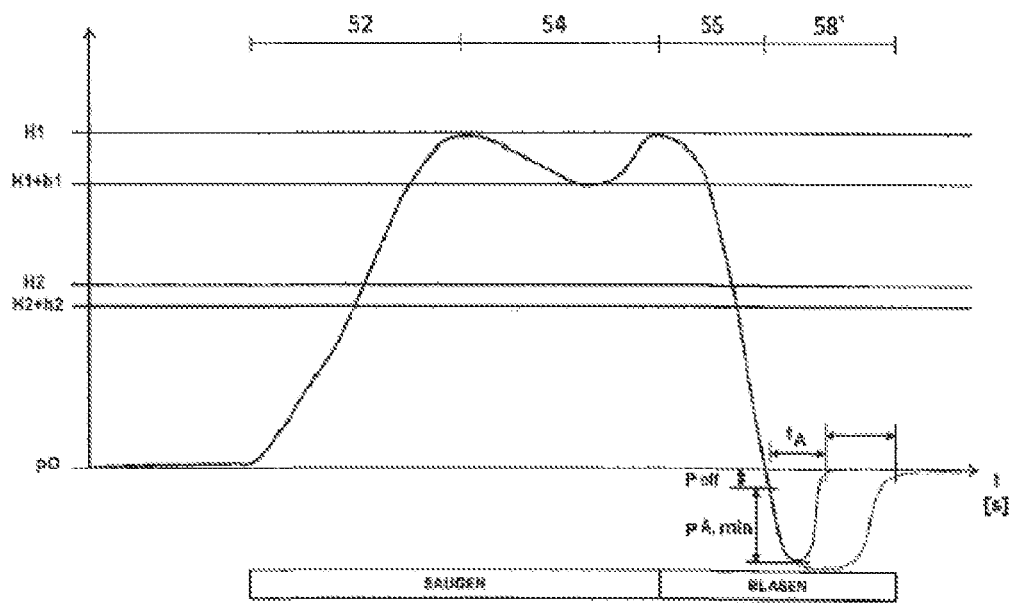
FIG. 5 shows a schematic depiction for explaining an energy optimized blow-off procedure.

By way of example, the course of the pressure at the suction connection 20 while manipulating a workpiece (work cycle) is depicted in FIG. 5, wherein an energy optimized blow-off occurs in a fourth work period 58'. After picking up the workpiece in the first work period 52, and manipulation during the second work period 54 (cf. FIG. 2), the vacuum at the suction connection 20 subsides in order to release the workpiece (e.g. third work period 56).

In the following it is assumed that the equilibrium pressure pG has been determined in a preceding diagnosis cycle, and has been stored, for example, in the control device 40. Through the use of the equilibrium pressure pG, the blow-off procedure can be optimized in terms of energy consumption. The course of the pressure for the blow-off of the workpiece illustrated in FIG. 2 is depicted in FIG. 5 by a broken line. In order to reduce the energy expenditure during the work period 58', a minimum blow-off pressure pAmin can be determined from the equilibrium pressure pG. This is selected to be high enough that, for example, the flow resistance in the system can be overcome. Due to the measurement of the equilibrium pressure pG, it is possible to determine an optimal value for the blow-off pressure pAmin, such that a reliable release of the workpiece is ensured, on one hand, and the energy expenditure is kept to a minimum, on the other hand. In order, for example, to compensate for system fluctuations, and to ensure a reliable release, a safety offset puff (ca. 10 mbar in the example) can be added to the minimum blow-off pressure pAmin, to supplement the minimum blow-off pressure pAmin.

A measurement of the pressure at the suction connection 20 also makes it possible to keep the blow-off time period tA, during which the pressure at the suction connection 20 increases to above the ambient pressure p0, as short as possible. In particular, the blow-off time period to can be selected such that it is short enough that the pressure at the suction connection 20, starting from the ambient pressure p0, increases to the minimum blow-off pressure pAmin, lying above the ambient pressure, and optionally, with the safety offset $p_{off}$ added thereto, and then returns to the ambient pressure, without stopping the pressure. This enables an energy saving operation.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for operating a manipulator system including: a vacuum manipulator device for manipulating a workpiece, and a vacuum generator for generating a vacuum, wherein the vacuum generator has a suction connection for suctioning in order to provide a vacuum supply for the vacuum manipulator device, wherein diagnosis cycles are executed during operation of the manipulator system, said diagnosis cycle comprising the steps of:

providing a vacuum for the vacuum manipulator device, and suctioning without a workpiece over the course of a predefined diagnosis time period for a diagnosis cycle;

measuring equilibrium pressure obtained at the suction connection with a suction pressure sensor;

monitoring variations to the equilibrium pressure determined in different diagnosis cycles;

wherein a first pressure decrease time period is measured in a work cycle via a timing device, over the course of which pressure at the suction connection decreases from ambient pressure to a control threshold value; and/or a second pressure decrease time period is measured with the timing device, over the course of which pressure at the suction connection decreases from the control threshold value to a holding value; and wherein the pressure at the suction connection during the work cycle, after picking up the workpiece (16), increases to a blow-off pressure lying above ambient pressure, wherein the blow-off pressure is determined in relation to the equilibrium pressure.

2. The method as set forth in claim 1, wherein a signal representing the equilibrium pressure is issued via a communications interface.

3. The method as set forth in claim 1, further including execution of a characterization cycle including the steps of:
connecting the suction connection on the vacuum generator to a calibration suction hole on the vacuum generator;
providing a vacuum at the suction connection and suctioning through the calibration suction hole;
measuring a calibration pressure obtained at the suction connection.

4. The method as set forth in claim 1, wherein the vacuum supply is deactivated after pressure measured at the suction connection reaches, or has fallen below, a holding value, and after deactivation, a pressure change rate and/or elapsed time for the pressure prevailing at the suction connection are determined.

5. The method as set forth in claim 1, wherein the equilibrium pressure (pG) is compared with a predefined control threshold value laying between ambient pressure and a holding value, wherein a warning signal is issued if the equilibrium pressure lies beneath the control threshold value.

6. A vacuum generator for executing the method as set forth in claim 1, said vacuum generator including a suction connection for suctioning, a suction pressure sensor for measuring pressure at the suction connection, and a communications interface for transmitting measurement values from the suction pressure sensor, wherein the equilibrium pressure is measured, obtained during suctioning without a workpiece over the course of a predefined diagnosis time period.

7. The vacuum generator as set forth in claim 6, further including a controllable calibration valve, whereby the suction connection can be connected selectively to at least one operation output for a vacuum manipulator device, or to a calibration suction hole on the vacuum generator.

* * * * *